(12) United States Patent
Wang et al.

(10) Patent No.: US 6,729,662 B2
(45) Date of Patent: May 4, 2004

(54) LOCKABLE BEZEL

(75) Inventors: Chih-Chung Wang, Taipei (TW); Chih-Hsiang Lee, Taoyuan (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 59 days.

(21) Appl. No.: 10/163,063

(22) Filed: Jun. 5, 2002

(65) Prior Publication Data

US 2003/0227239 A1 Dec. 11, 2003

(51) Int. Cl.[7] .............................................. E05C 9/10
(52) U.S. Cl. .......................................... 292/42; 292/42
(58) Field of Search .......................... 292/42, 162, 175, 292/146; 312/223.2, 265.5, 265.6; 361/726, 725, 724, 683, 684, 685

(56) References Cited

U.S. PATENT DOCUMENTS

| | | | | |
|---|---|---|---|---|
| 3,473,834 A | * | 10/1969 | Lehmann et al. | 292/175 |
| 4,204,724 A | * | 5/1980 | Bauer et al. | 396/522 |
| 4,892,338 A | * | 1/1990 | Weinerman et al. | 292/35 |
| 4,908,728 A | * | 3/1990 | Pinkett | 360/137 |
| 5,307,238 A | * | 4/1994 | Marcus | 361/681 |
| 5,421,627 A | * | 6/1995 | Yane | 292/162 |
| 6,109,710 A | * | 8/2000 | Wu et al. | 312/223.2 |
| 6,176,041 B1 | * | 1/2001 | Roberts | 49/395 |
| 6,398,325 B1 | * | 6/2002 | Chen et al. | 312/223.2 |

* cited by examiner

*Primary Examiner*—Janet M. Wilkens

(57) ABSTRACT

A lockable bezel is disclosed. The lockable device comprises a main body, a transmission shaft, an elastic device and a latch. The main body has a first end and a second end. The transmission shaft has a first end and a second end, and is movably connected to the main body with the first end near to the first end of the main body and the second end near to the second end of the main body. The elastic device has a first end fixed on the main body and a second end fixed on the transmission shaft. The first end of the elastic device is near the first end of the main body and the second end of the elastic device is near the second end of the main body. The latch is coupled to the first end of the transmission shaft for locking in the hole of the base.

20 Claims, 6 Drawing Sheets

LOCKABLE BEZEL

BACKGROUND OF THE INVENTION

1. Field of the Invention

The invention relates in general to a lockable device, and more particularly to a lockable and ejectable bezel for installing in a server housing.

2. Description of the Related Art

A server is the main computer on a network, that controls all the others. It is one of the computers on a network that provides a special service. File servers, printer servers and mail servers are three main categories.

The conventional housing server includes a bezel and a panel. The conventional bezel is mounted at the housing and is hard to remove therefrom. For a manufacturer or an end user, a fixed and irremovable bezel of a server housing is quite inconvenient. Because they frequently need to dismount the server.

SUMMARY OF THE INVENTION

It is therefore an object of the invention to provide a lockable bezel of a server, which has the advantages of easy attaching and easy dismounting.

It is another object of the invention to provide a lockable device for locking in and ejecting from a base. The lockable device comprises a main body, a transmission shaft, an elastic device and a latch. The main body has a first end and a second end. The transmission shaft has a first end and a second end, and is movably connected to the main body with the first end near to the first end of the main body and the second end near to the second end of the main body. The elastic device has a first end fixed on the main body and a second end fixed on the transmission shaft. The first end of the elastic device is near the first end of the main body and the second end of the elastic device is near the second end of the main body. The latch is coupled to the first end of the transmission shaft for locking in the hole of the base.

The invention achieves the above-identified objects by providing a lockable bezel for locking in and ejecting from a housing base of a server. The lockable bezel comprises a main body, a stop bar, the first transmission shaft, the second transmission shaft, the first elastic device, the second elastic device, the first latch, and the second latch. The main body has a first end adjacent to the first hole of the housing base and a second end adjacent to the second hole of the housing base. The stop bar is substantially at a center of the main body. The first transmission shaft is between the stop bar and the first end of the main body. The first transmission shaft has a first end and a second end and is movably connected to the main body with the first end near to the first end of the main body and the second end near to the stop bar. The second transmission shaft is between the stop bar and the second end of the main body, wherein the second transmission shaft has a third end and a fourth end and is movably connected to the main body with the fourth end near to the second end of the main body and the third end near to the stop bar. The first spring has a first end fixed on the main body and a second end fixed on the first transmission shaft. The first end of the first spring is near the first end of the main body and the second end of the first spring is near the stop bar. The second spring has a first end fixed on the second transmission shaft and a second end fixed on the main body. The first end of the second spring is near the stop bar and the second end of the second spring is near the second end of the main body. The first latch is coupled to the first end of the first transmission shaft for locking in the first hole of the housing base. The second latch is coupled to the fourth end of the second transmission shaft for locking in the second hole of the housing base.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
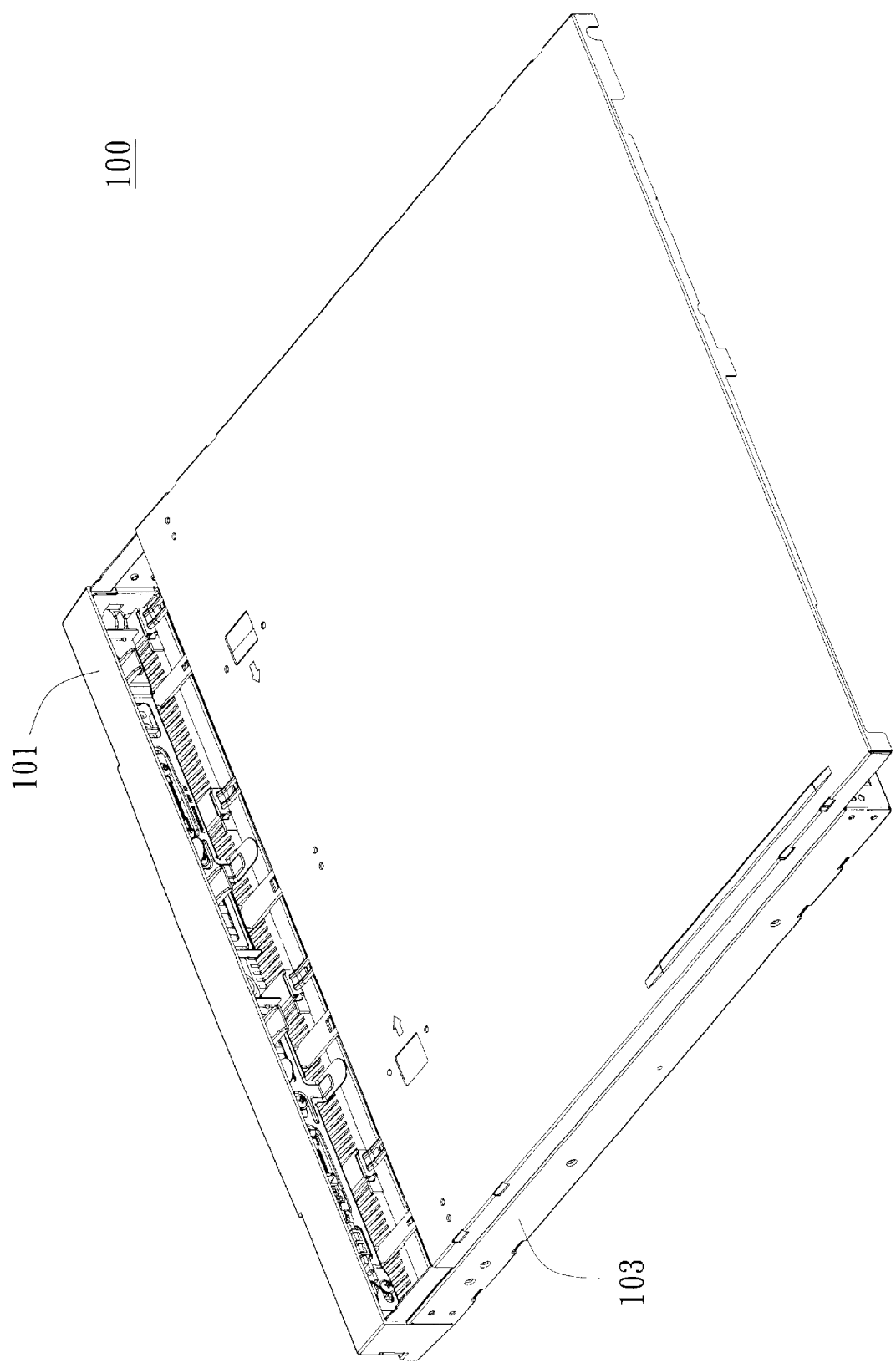
FIG. 1 shows a lockable bezel according to a preferred embodiment of the invention, while it is locked into a housing base of a server.
Figure 2:
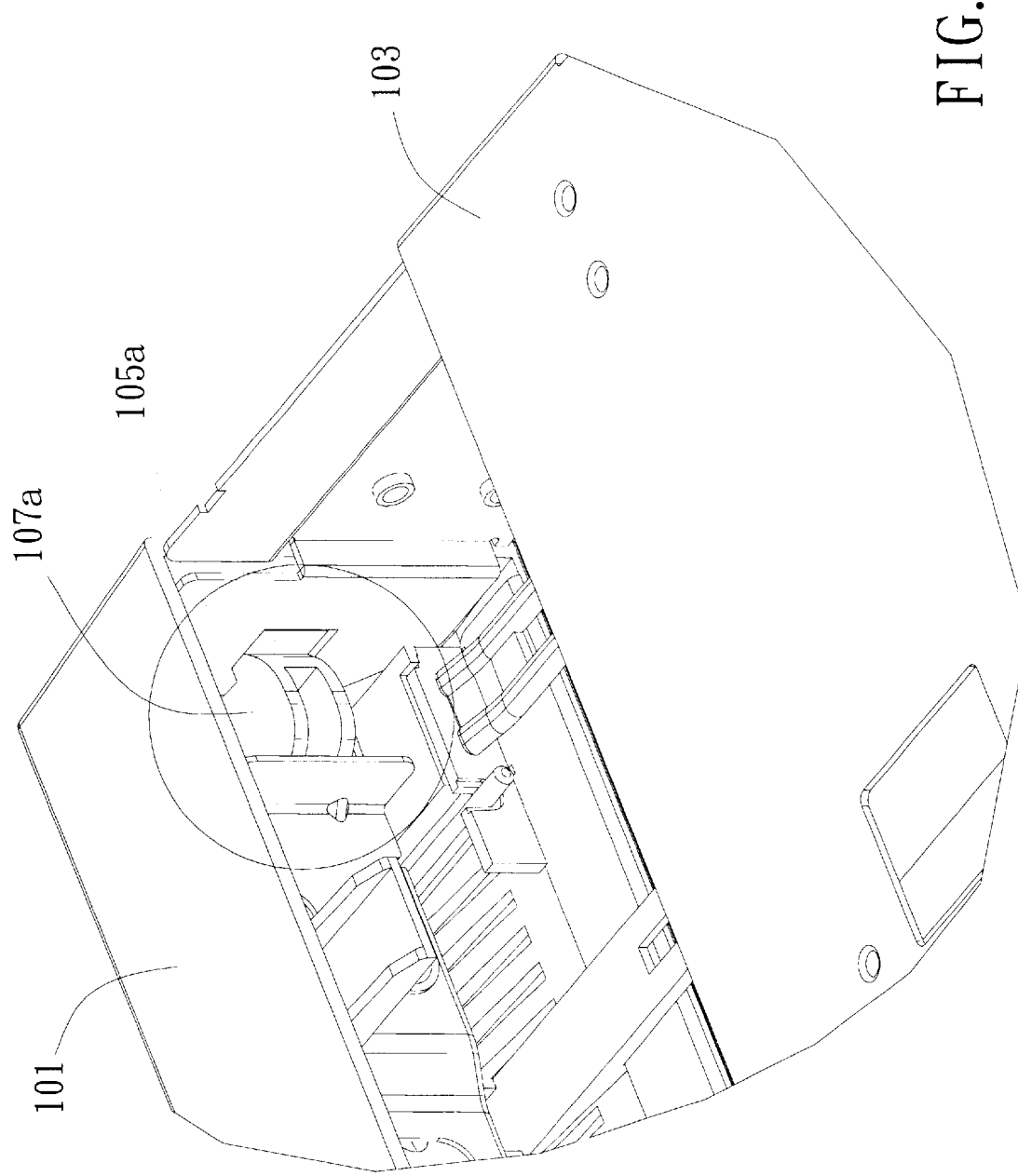
FIG. 2 is the detailed view of the latch according to a preferred embodiment of the invention.
Figure 3:
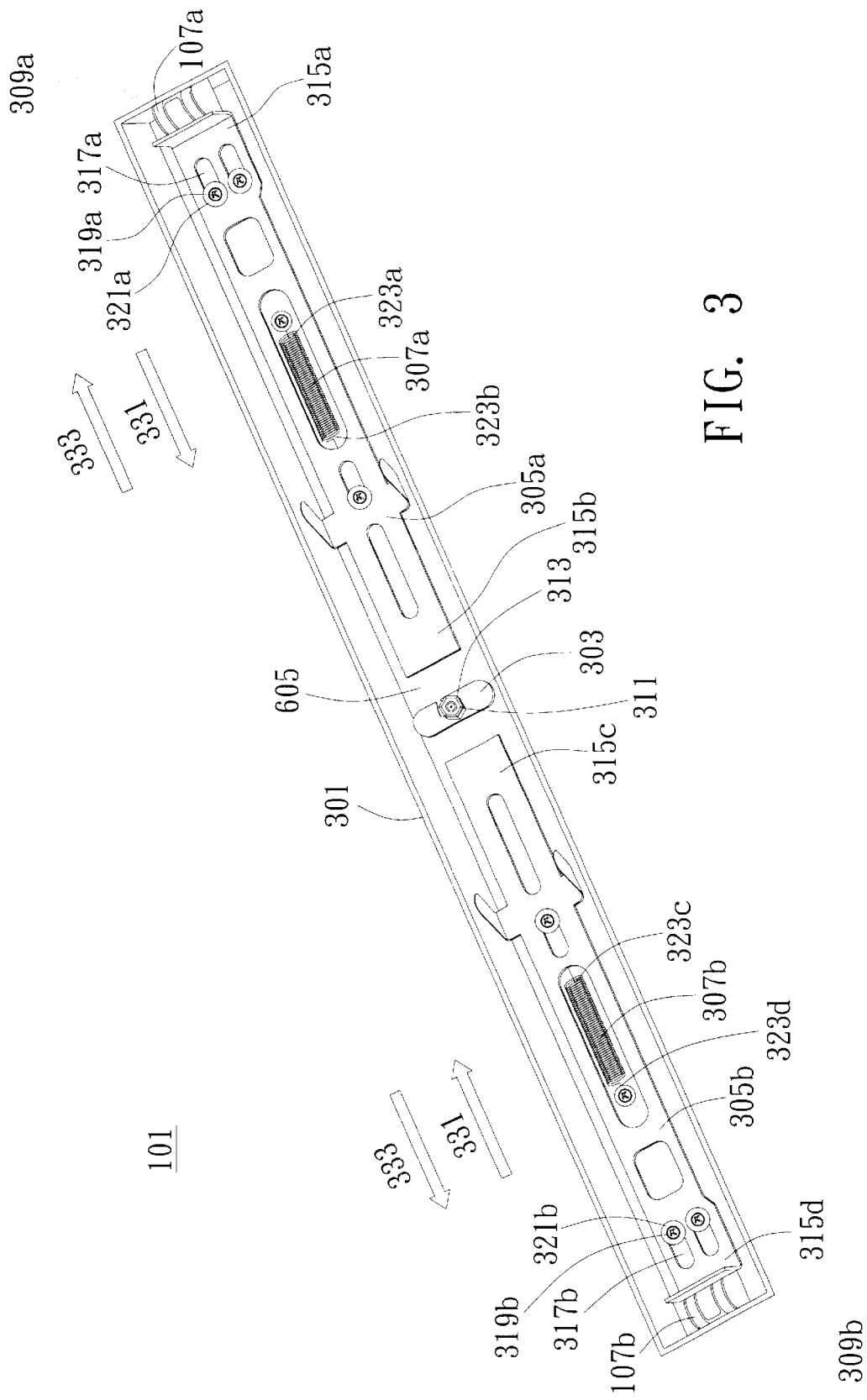
FIG. 3 illustrates the bezel according to a preferred embodiment of the invention while the stop bar is perpendicular to the transmission shafts.

FIG. 1 shows a lockable bezel 101 of the invention, while it is locked into a housing base 103 of a server 100. As shown in FIG. 2, the lockable bezel 101 is locked into the housing base 103 by attaching the first latch 107a and the second latch 107b (FIG. 3) to the housing base 103 through two holes, the first hole 105a and the second hole (not shown) of the housing base 103. The latches 107a and 107b are coupled to respective buttons 601a and 601b (FIG. 6) on the other side of the main body. Then, as shown in FIG. 3, by pushing the buttons toward the stop bar 303, the bezel 101 can be easily removed from the housing base 103. While it is desired to fix the bezel 101 onto the housing base 103, mounting the bezel 101 to the housing base 103 and pushing and releasing the buttons will firmly fix the bezel 101 onto the housing base 103. That is, while the transmission shaft is released, the elastic device forces the transmission shaft to move away from the stop bar 303 so that the latch is able to lock into the hole of the base.

The detail mechanism of the lockable bezel 101 is illustrated in FIG. 3. The major components of the bezel 101 comprises a main body 301, a stop bar 303, the first transmission shaft 305a, the second transmission shaft 305b, the first elastic device 307a, the second elastic device 307b, the first latch 107a, and the second latch 107b. Of course, the components of the bezel 101 are not limited to the above-listed. Other components beneficial to the functions of the bezel 101 can be added.

For the purpose of describing the orientation and the relative position of the components, the main body 301 is defined to have two ends, the first end 309a and the second end 309b. The first end 309a of the main body 301 is adjacent to the first hole 105a of the housing base 103 (FIG. 2) and the second end 309b of the main body 301 is adjacent to the second hole (not shown) of the housing base 103.

The stop bar 303 is positioned substantially at the center of the main body 301. The stop bar 303 is attached onto the main body 301 by a screw 311 and a screw nut 313. The stop bar 303 is set between the first transmission shaft 305a and the second transmission shaft 305b. The stop bar 303 is able to rotate in an aspect parallel to the main body 301. While the stop bar 303 lies perpendicularly to the first transmission shaft 305a and the second transmission shaft 305b, as shown in FIG. 3 and FIG. 5, there exist spaces between the transmission shafts 305a and 305b and the stop bar 303. Accordingly, the lockable device is in an unlocked status. So the first transmission shaft 305a and the second transmission shaft 305b can be enforced to move toward the stop bar 303, as shown by arrow 331. Consequentially, the bezel 101 can be ejected from the housing base 103 and the bezel 101 is in a disengagement state. On the other hand, while the stop bar 303 is rotated and laid parallel to the first transmission shaft 305a and the second transmission shaft 305b, as shown in FIG. 4, the first transmission shaft 305a and the second transmission shaft 305b are fixed, and thus the first latch 107a and the second latch 107b are locked respectively at the first hole 105a and at the second hole (not shown) of the main body 301.

Figure 4:
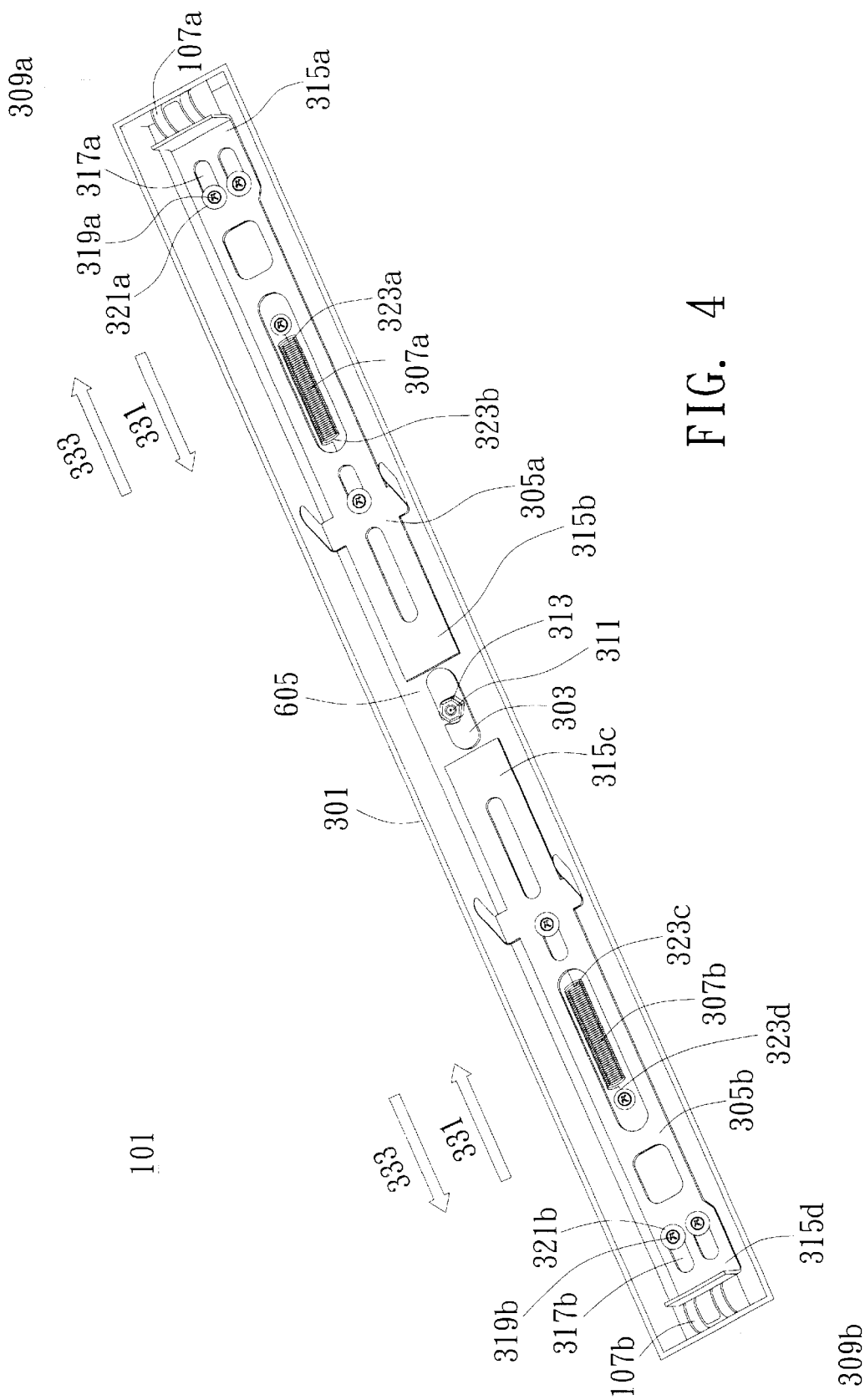
FIG. 4 illustrates the bezel according to a preferred embodiment of the invention while the stop bar is parallel to the transmission shafts.
Figure 5:
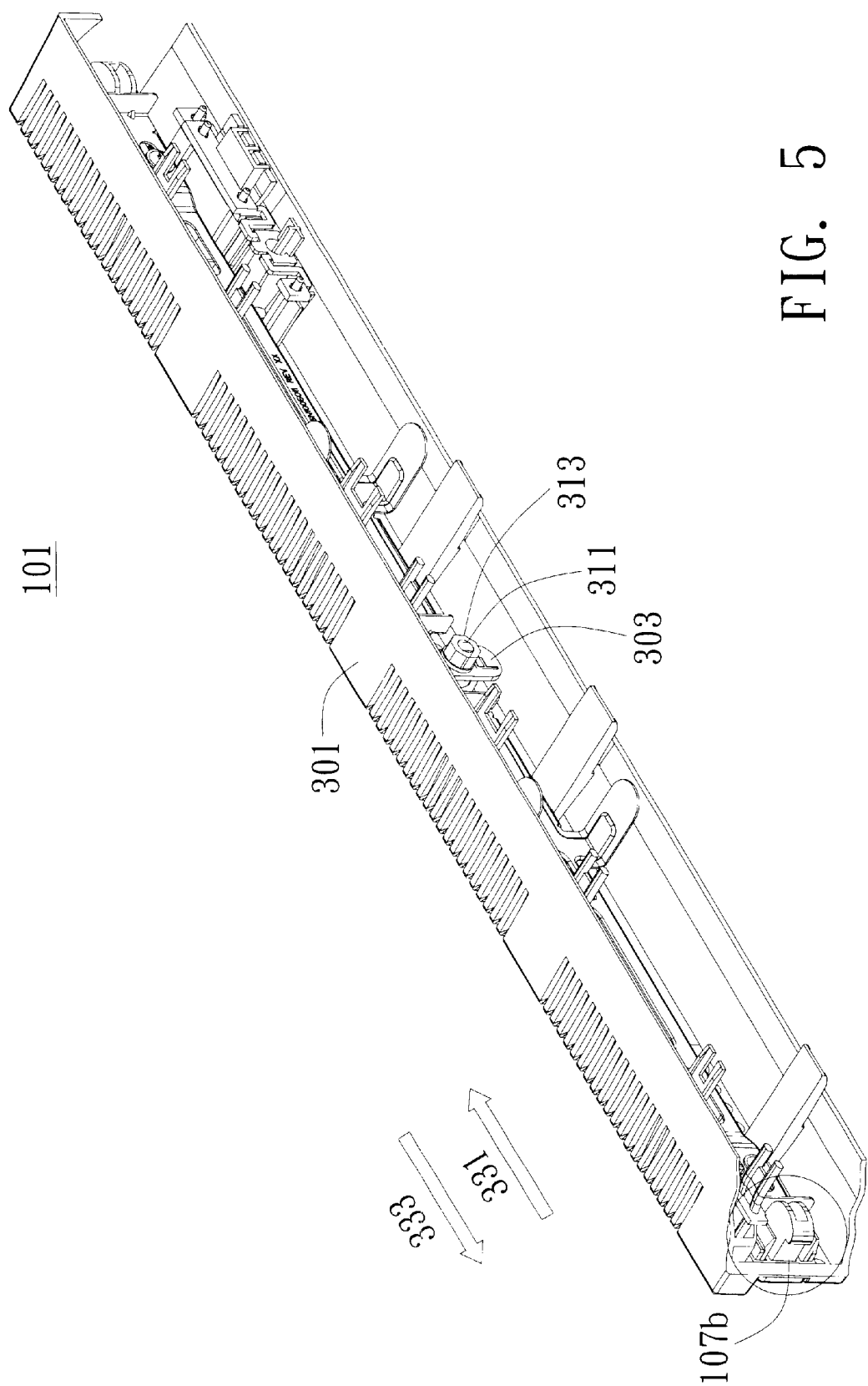
FIG. 5 is a prospective top view of the bezel according to a preferred embodiment of the invention.

Referring to FIG. 3 and FIG. 4, the first transmission shaft 305a is between the stop bar 303 and the first end 309a of the main body 301. For the purpose of describing the orientation and the relative position of the components, the first transmission shaft 305a is defined to have two ends, the first end 315a and the second end 315b. The first end 315a is near to the first end 309a of the main body 301 and the second end 315b is near to the stop bar 303. The first transmission shaft 305a is movably connected to the main body 301 by forming a hole 317a on the first transmission shaft 305a and rotating a screw 319a through a washer 321a, the hole 317a, and another hole (not shown) on the main body 301. The hole 317a of the first transmission shaft 305a is wider in diameter than the screw 319a, and is elongated in a direction toward the stop bar 303. The mechanism including a hole on the first transmission shaft 305a, a washer, and a screw for facilitating the fixation and movement of the first transmission shaft 305a is not limited to one set. In FIG. 3 and FIG. 4, three sets of mechanisms are shown, with two of them parallel to each other.

A further component of the bezel 101 is the first elastic device 307a, preferably a spring. For the purpose of describing the orientation and the relative position of the components, the elastic device 307a is defined to have two ends, the first end 323a and the second end 323b. The first end 323a of the elastic device 307a is near the first end 309a of the main body 301 and the second end 323b is near the stop bar 303. The second end 323b of the elastic device 307a is fixed on the first transmission shaft 305a by, for example, soldering, and the first end 323a is fixed, for example, by screwing, to the main body 301. The elastic device 307a provides resilient force to let the first transmission shaft 305a move away from the stop bar 303.

Figure 6:
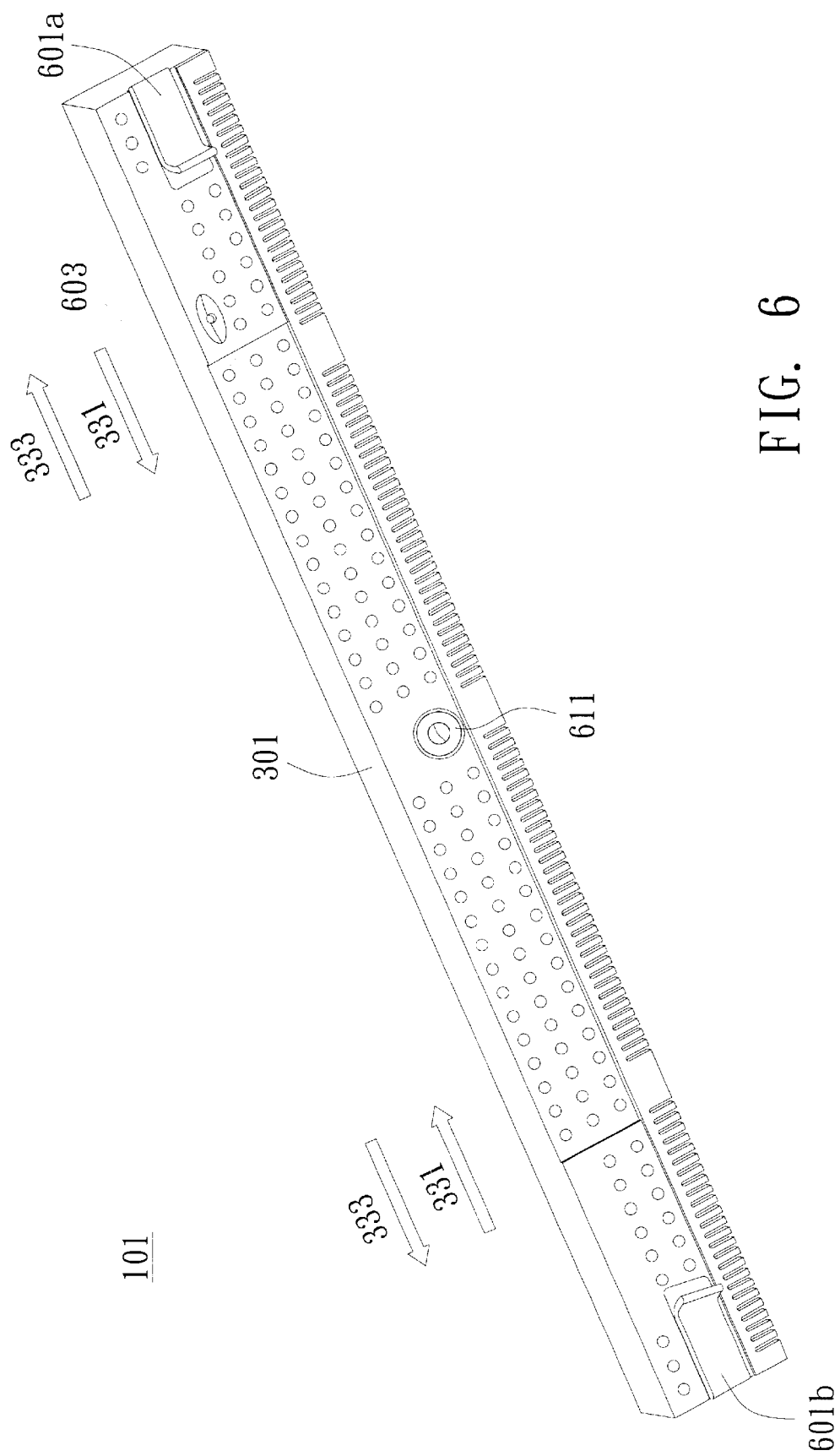
FIG. 6 is a prospective front view of the bezel according to a preferred embodiment of the invention.

The first latch 107a coupled to the first end 315a of the first transmission shaft 305a is also one of the major components of the bezel 101. The detailed figure of the latch 107a and the attachment between the latch 107a and the hole 105a of the housing base 103 are shown in FIG. 2 and FIG. 5. A button 601a, as shown in FIG. 6, is coupled to the first latch 107a and is positioned at another face 603 of the main body 301, opposite to the face 605 where the first transmission shaft 305a is positioned.

Furthermore, the second transmission shaft 305b is positioned between the stop bar 303 and the second end 309b of the main body 301. The second transmission 305b substantially has the same figures as the first transmission shaft 305a except that it is a mirror image of the first transmission shaft 305a and the two transmission shafts are orientated differently. For the purpose of describing the orientation and the relative position of the components, the second transmission shaft 305b is defined to have two ends, the third end 315c and the fourth end 315d. The fourth end 315d is near to the second end 309b of the main body 301 and the third end 315c is near to the stop bar 303. The second transmission shaft 305b is movably connected to the main body 301 by forming a hole 317b on the second transmission shaft 305b and rotating a screw 319b through a washer 321b, the hole 317b, and another hole (not shown) on the main body 301. The hole 317b of the second transmission shaft 305b is wider in diameter than the screw 319b, and is elongated in a direction toward the stop bar 303. The mechanism, which comprises a hole on the second transmission shaft 305b, a washer, and a screw, for facilitating the fixing and movement of the second transmission shaft 305b is not limited to one set. In FIG. 3 and FIG. 4, three sets of mechanisms are shown, with two of them parallel to each other.

A further component of the bezel 101 is the second elastic device 307b, preferably a spring. For the purpose of describing the orientation and the relative position of the components, the elastic device 307b is defined to have two ends, the third end 323c and the fourth end 323d. The fourth end 323d of the elastic device 307b is near the second end 309b of the main body 301 and the third end 323c is near the stop bar 303. The third end 323c of the elastic device 307b is fixed on the second transmission shaft 305b by, for example, soldering, and the fourth end 323d is fixed, for example, by screwing, to the main body 301. The elastic device 307b provides resilient force to let the first transmission shaft 305b move away from the stop bar 303.

The second latch 107b coupled to the fourth end 315d of the second transmission shaft 305b is also one of the major components of the bezel 101. The detailed figure of the latch 107b is substantially the same as the latch 107a. And the attachment between the latch 107b and the hole 105b of the housing base 103 is also substantially the same as that between the latch 107a and the hole 105a, as shown in FIG. 2 and FIG. 5. A button 601b, as shown in FIG. 6, is coupled to the second latch 107b and is positioned at another face 603 of the main body 301 opposite to the face 605 where the second transmission shaft 305b is positioned.

By the disclosed mechanism of the invention, the bezel 101 can be easily removed from the housing base 103 by pushing the buttons toward the stop bar 303. The bezel 101 can be firmly fixed onto the housing base 103, simply by mounting the bezel 101 to the housing base 103 and pushing and releasing the buttons, if it is desired to have the bezel 101 fixed onto the housing base 103.

Moreover, the bezel 101 of the invention can further comprise a lock hole 611 at the other face 603 of the main body 301 opposite to the stop bar 303. The lock hole 611 is connected to the stop bar 303 and controls the locked and unlocked status of the stop bar 303.

While the invention has been described by an example with two transmission shafts, it is to be understood that the invention is not limited thereto. A bezel with only one or more than two transmission shafts and corresponding devices is also within the scope of the invention. Furthermore, even though the lockable and ejectable device has been described as a bezel of a server housing, it is apparent that the invention can be extended to any device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lockable device for locking in and ejecting from a base, wherein the base has a hole, comprising:
    a main body, wherein the main body has a first end and a second end;
    a stop bar substantially at a center of the main body;
    a transmission shaft, having a first end and a second end, movably connected to the main body with the first end near to the first end of the main body and the second end near to the stop bar;
    an elastic device with a first end fixed on the main body and a second end fixed on the transmission shaft, wherein the first end of the elastic device is near the first end of the main body and the second end of the elastic device is near the stop bar; and
    a latch coupled to the first end of the transmission shaft for locking in the hole of the base.

2. A lockable device as claimed in claim 1, while the transmission shaft is enforced to move in a first direction which is from the first end of the main body to the second end of the main body, the latch being removed from the hole of the base and the lockable device being unlocked.

3. A lockable device as claimed in claim 2, the main body being in a disengagement state and being able to be removed away from the base.

4. A lockable device as claimed in claim 2, while the transmission shaft is released, the elastic device forcing the transmission shaft to move in a second direction opposite to the first direction, and the latch locking in the hole of the base.

5. A lockable device as claimed in claim 2, wherein the transmission shaft is enforced by pushing a button which is coupled to the latch and positioned at another face of the main body opposite to the transmission shaft.

6. A lockable device as claimed in claim 1, wherein the elastic device is a spring.

7. A lockable device as claimed in claim 1, wherein the transmission shaft is movable connected to the main body by forming a hole on the transmission shaft and rotating a screw through a washer, the hole of the transmission shaft and a hole of the main body, wherein the hole of the transmission shaft is wider in diameter than the screw, and is elongated in the first direction.

8. A lockable device for locking in and ejecting from a base, wherein the base has a first hole and a second hole, comprising:
    a main body, wherein the main body has a first end adjacent to the first hole of the base and a second end adjacent to the second hole of the base;
    a stop bar substantially at a center of the main body;
    a first transmission shaft between the stop bar and the first end, wherein the first transmission shaft has a first end and a second end and is movably connected to the main body with the first end near to the first end of the main body and the second end near to the stop bar;
    a second transmission shaft between the stop bar and the second end, wherein the second transmission shaft has a third end and a fourth end and is movably connected to the main body with the fourth end near to the second end of the main body and the third end near to the stop bar;
    a first elastic device with a first end fixed on the main body and a second end fixed on the first transmission shaft, wherein the first end of the first elastic device is near the first end of the main body and the second end of the first elastic device is near the stop bar;
    a second elastic device with a first end fixed on the second transmission shaft and a second end fixed on the main body, wherein the first end of the second elastic device is near the stop bar and the second end of the second elastic device is near the second end of the main body;
    a first latch coupled to the first end of the first transmission shaft for locking in the first hole of the base; and
    a second latch coupled to the fourth end of the second transmission shaft for locking in the second hole of the base.

9. A lockable device as claimed in claim 8, while the stop bar lies perpendicular to the first transmission shaft and the second transmission shaft, the first transmission shaft and the second transmission shaft being able to be enforced to move toward the stop bar.

10. A lockable device as claimed in claim 9, while the first transmission shaft and the second transmission shaft are enforced to move toward the stop bar, the first latch and the second latch being removed from the first hole and the second hole of the base and the lockable device being unlocked.

11. A lockable device as claimed in claim 9, the main body being in a disengagement state and being able to be removed away from the base.

12. A lockable device as claimed in claim 9, while the first transmission shaft and the second transmission are released, the first elastic device and the second elastic device forcing the first transmission shaft and the second transmission shaft respectively to move away from the stop bar, and the first latch and the second latch locking in the first hole and the second hole of the base, respectively.

13. A lockable device as claimed in claim 9, wherein the first transmission shaft and the second transmission shaft are enforced respectively by pushing a first button and a second button, which are respectively coupled to the first latch and the second latch and positioned at another face of the main body opposite to the first transmission shaft and the second transmission shaft.

14. A lockable device as claimed in claim 8, wherein the first elastic device is a spring.

15. A lockable device as claimed in claim 8, wherein the second elastic device is a spring.

16. A lockable device as claimed in claim 8, wherein the first transmission shaft is movable connected to the main body by forming a hole on the first transmission shaft and rotating a screw through a washer and the hole of the first transmission shaft and removably attached on the main body, wherein the hole of the first transmission shaft is wider in diameter than the screw, and is elongated toward the stop bar.

17. A lockable device as claimed in claim 8, wherein the second transmission shaft is movable connected to the main body by forming a hole on the second transmission shaft and rotating a screw through a washer and the hole of the second transmission shaft and removably attached on the main body, wherein the hole of the second transmission shaft is wider in diameter than and, is elongated toward the stop bar.

18. A lockable device as claimed in claim 8, while the stop bar lies parallel to the first transmission shaft and the second transmission shaft, the first transmission shaft and the second transmission shaft being fixed and the first latch and the second latch being locked at the first hole and the second hole of the main body, respectively.

19. A lockable device as claimed in claim 8, wherein the lockable device further comprises a lock hole at the other face of the main body opposite to the stop bar and connected to the stop bar.

20. A lockable bezel for locking in and ejecting from a housing base of a server, wherein the housing base has a first hole and a second hole, and the lockable bezel comprises:
- a main body, wherein the main body has a first end adjacent to the first hole of the housing base and a second end adjacent to the second hole of the housing base;
- a stop bar substantially at a center of the main body;
- a first transmission shaft between the stop bar and the first end of the main body, wherein the first transmission shaft has a first end and a second end and is movably connected to the main body with the first end near to the first end of the main body and the second end near to the stop bar;
- a second transmission shaft between the stop bar and the second end of the main body, wherein the second transmission shaft has a third end and a fourth end and is movably connected to the main body with the fourth end near to the second end of the main body and the third end near to the stop bar;
- a first spring with a first end fixed on the main body and a second end fixed on the first transmission shaft, wherein the first end of the first spring is near the first end of the main body and the second end of the first spring is near the stop bar;
- a second spring with a first end fixed on the second transmission shaft and a second end fixed on the main body, wherein the first end of the second spring is near the stop bar and the second end of the second spring is near the second end of the main body;
- a first latch coupled to the first end of the first transmission shaft for locking in the first hole of the housing base; and
- a second latch coupled to the fourth end of the second transmission shaft for locking in the second hole of the housing base.

* * * * *